United States Patent [19]

Suzukawa et al.

[11] Patent Number: 4,604,143
[45] Date of Patent: Aug. 5, 1986

[54] DEMOLITION FACILITATING AGENT

[75] Inventors: Yuichi Suzukawa; Waichi Kobayashi; Satoshi Ohtaka, all of Ube, Japan

[73] Assignee: Ube Industries, Ltd., Yamaguchi, Japan

[21] Appl. No.: 726,284

[22] Filed: Apr. 24, 1985

Related U.S. Application Data

[63] Continuation of Ser. No. 533,887, Sep. 20, 1983, abandoned, which is a continuation of Ser. No. 376,238, May 7, 1982, abandoned.

[30] Foreign Application Priority Data

May 19, 1981 [JP] Japan ................................. 56-74195

[51] Int. Cl.[4] ............................................... C04B 7/04
[52] U.S. Cl. ............................................ 106/89; 106/90; 106/109; 106/111; 106/118
[58] Field of Search ................ 106/89, 90, 109, 110, 106/111, 117, 118

[56] References Cited

U.S. PATENT DOCUMENTS

| 3,884,710 | 5/1975 | Allen et al. | 106/89 |
| 3,947,288 | 3/1976 | Kawano et al. | 106/109 |
| 4,076,546 | 2/1978 | Simeonov et al. | 106/89 |
| 4,316,583 | 2/1982 | Kawano et al. | 106/109 |
| 4,378,997 | 4/1983 | Kasama et al. | 106/89 |
| 4,508,574 | 4/1985 | Kurandt et al. | 106/118 |

FOREIGN PATENT DOCUMENTS 28513 5/1981 European Pat. Off. ............... 106/89

*Primary Examiner*—Andrew H. Metz
*Assistant Examiner*—Anthony McFarlane
*Attorney, Agent, or Firm*—Burgess, Ryan & Wayne

[57] ABSTRACT

A demolition-facilitating agent for durable structures, for example, concrete structures and rocks, comprises (A) 100 parts by weight of a mixture in the form of fine particles, consisting essentially of (1) 90 to 99% by weight of a clinker consisting of (a) 15 to 97% by weight of free CaO crystals, (b) 3 to 85% by weight of free $3CaO \cdot SiO_2$ crystals and (c) 0 to 10% by weight of an inevitable impurity, the clinker having been produced at a sintering temperature of 1200° C. or more, and (2) 1 to 10% by weight, in terms of gypsum anhydride ($CaSO_4$), of at least one gypsum compound; and (B) 0.4 to 4 parts by weight of a cement water-reducing agent.

8 Claims, No Drawings

DEMOLITION FACILITATING AGENT

This application is a continuation of application Ser. No. 533,887, filed Sept. 20, 1983 now abandoned and which is a continuation of Ser. No. 376,238, filed 5/7/82 now abandoned.

FIELD OF THE INVENTION

The present invention relates to a demolition-facilitating agent for durable structures. More particularly, the present invention relates to an agent for facilitating demolition processes, for example, processes for demolishing concrete structures, brick structures, rocks and other durable structures.

BACKGROUND OF THE INVENTION

It is well-known that durable structures such as concrete structures, brick structures or rocks can be demolished by utilizing an explosive material, for example, dynamite, which has an excellent demolishing effect. However, the use of explosive material presents an environmental problem due to the generation of a tremendous explosive noise, vibration, and shock and the scattering of dust and stones, and furthermore it is always dangerous.

Also, it is well-known that durable structures can be demolished by means of mechanical methods using an impact steel ball, a rock drill or a pick hammer. However, the mechanical methods exhibit a relatively small demolition effect and usually generate tremendous noise and vibration.

Various attempts have been made to remove the above-mentioned disadvantages of the conventional explosive and mechanical methods by utilizing an expansible material. In the attempts, a necessary number of holes were formed in a durable structure and were filled with an aqueous slurry of an expansible material so as to allow the expansible material in the holes to hydrate and to create a large expanding force. In a most typical example, the expanding force can be created by the hydrating reaction of quick lime.

The quick lime expansion method is advantageous in that no noise, vibration or shock is produced by the demolition process, except for noise produced when the holes are formed in the durable structure by means of a drilling procedure. Also, the quick lime expansion method is not dangerous.

However, the quick lime expansion method is disadvantageous in that the hydrating reaction of the quick lime takes place extremely rapidly. As soon as the quick lime is mixed with water, the hydration of the quick lime is carried out and the mixture expands rapidly. This rapid hydration of the quick lime results in a rapid increase in the viscosity of the mixture and, therefore, in a difficulty in pouring the mixture into the holes formed in the durable structure to be demolished. Even if the mixture could be poured into the holes, the mixture would immediately spring out of the holes due to the rapid expansion thereof. In this case, the expanding pressure generated by the mixture cannot be utilized to demolish a durable structure.

Various attempts have been made to remove the disadvantages of the conventional quick lime expansion method. For example, in the demolition method disclosed in Japanese Patent Application Laid-open No. 51-128131 (1976), the upper openings of holes formed in a durable structure are sealed with lids which are firmly fixed to the durable structure. This method is effective for preventing the springing out of the quick lime aqueous slurry. However, it is disadvantageous in that the procedure for fixing the lids to the durable structure requires much time and labor and is costly.

In a method disclosed in Japanese Patent Application Publication Nos. 47-40692 (1972), 50-869 (1975) and 50-7372 (1975), a hydration-retarding agent comprising a silico-fluoride compound is added to the quick lime aqueous slurry. In this method, it is difficult to adequately control the addition of the hydration-retarding agent on the basis of the hydrating property of the quick lime used.

In the demolition facilitaing agent disclosed in Japanese Patent Application Laid-open No. 55-142894 (1980), CaO crystals are coated with $3CaO.SiO_2$ crystals in order to control the hydration rate of the CaO crystals. In this agent, since the content of CaO crystals in this agent is relatively small, the expansion pressure produced by the hydration of this agent is not very large. Also, this agent is disadvantageous in that when the clinker is produced from raw materials at an elevated sintering temperature, $CaSO_4$ contained in the raw materials is heat-decomposed so as to generate undesirable $SO_2$ gas.

The inventors of the present invention have carried out a large amount of research on the relationship between the expansion pressure created by a demolition-facilitating material and the demolition effect of the agent on a durable structure, for example, a concrete structure or rock. As a result of this research, the inventors found that when the expansion pressure produced by the demolition-facilitating agent is about 30 $kg/cm^2$ or more, it is possible to make cracks in the durable structure. Also, when the expansion pressure is 200 $kg/cm^2$ or more, it is possible to satisfactorily demolish the durable structure. That is, the demolishing effect can be increased by increasing the expansion pressure generated by the demolition-facilitating agent.

In consideration of the above-mentioned facts, the inventors of the present invention eagerly carried out research concerning a new type of demolition-facilitating agent which is capable of producing a large expansion pressure when it is brought into contact with water which exhibits a great demolition effect in the case of various durable structures and which is free from the disadvantages of the conventional demolition-facilitating materials.

SUMMARY OF THE INVENTION

An object of the present invention is to provide a demolition-facilitating agent for durable structures which is capable of producing a large expansion pressure and of exhibiting a great demolition effect when it is applied to a durable structure.

Another object of the present invention is to provide a demolition-facilitating agent for durable structures which exhibits an adequate hydrating reaction rate so that an aqueous slurry of the demolition-facilitating agent can be poured into holes formed in the durable structure without difficulty.

The above-mentioned objects can be attained by the demolition-facilitating agent of the present invention which comprises (A) 100 parts by weight of a mixture in the form of fine particles, consisting essentially of (1) 90 to 99% by weight of a clinker consisting of (a) 15 to 97% by weight of free CaO crystals, (b) 3 to 85% by weight of free 3CaO.SiO$_2$ crystals and (c) 0 to 10% by weight of an inevitable impurity, the clinker having been produced at a sintering temperature of 1,200° C. or more, and (2) 1 to 10% by weight, in terms of gypsum anhydride (CaSO$_4$), of at least one gypsum compound; and (B) 0.4 to 4 parts by weight of a cement water-reducing agent.

DETAILED DESCRIPTION OF THE INVENTION

The demolition-facilitating agent of the present invention is in the form of fine powder and consists of a composition comprising (A) a mixture of (1) a specific clinker component and (2) a gypsum component and (B) a cement water-reducing agent.

The specific clinker component is composed of (2) 15 to 97% by weight of free CaO crystals, (b) 3 to 85% by weight of free 3CaO.SiO crystals and (c) 0 to 10% by weight of an inevitable impurity. The clinker component is produced at a sintering temperature of 1,200° C. or more.

If the amounts of the free CaO crystals and the free 3CaO.SiO$_2$ crystals in the clinker component are more than 97% by weight and less than 3% by weight, respectively, the resultant demolition-facilitating agent exhibits an extremely large hydrating reaction rate to such an extent that when the demolition-facilitating agent is mixed with water and the resultant aqueous slurry is poured into holes formed in a durable structure, the poured slurry springs out of the holes due to the rapid expansion thereof. Also, if the amounts of the free CaO crystals and the free 3CaO.SiO$_2$ crystals in the clinker component are less than 15% by weight and more than 85% by weight, respectively, the resultant demolition-facilitating agent exhibits an unsatisfactory expansion pressure.

Generally, the hydration-expansion rate of the demolition-facilitating agent is variable depending on not only the mixing ratio in weight of the free CaO crystals to the free 3CaO SiO$_2$ crystals but also the temperature at which the demolition-facilitating agent reacts with water. That is, in summer when the ambient temperature is sufficiently high enough to carry out the hydrating reaction of the demolition-facilitating agent at a satisfactory reaction rate, there is no difficulty in using the demolition-facilitating agent. However, in winter when the ambient temperature is low, the hydrating reaction rate of the demolition-facilitating agent is unsatisfactorily low. Therefore, in winter, the hydrating reaction rate of the demolition-facilitating material is increased by increasing the proportion in weight of the free CaO crystals in the clinker component. The weight proportion of the free CaO crystals in the clinker component varies in the range of from 15 to 97% by weight depending on the ambient temperature.

The clinker component sometimes contains an inevitable impurity derived from raw materials used to produce the clinker component. That is, when the raw materials contain certain amounts of Al$_2$O$_3$ and Fe$_2$O$_3$, the resultant clinker component contains, as inevitable impurities, 3CaO.Al$_2$O$_3$ crystals and 4CaO.Al$_2$O$_3$.Fe$_2$O$_3$ crystals. The larger the amount of the inevitable impurity in the clinker component, the smaller the amount of the free CaO crystals, which are effective for creating the expansion pressure. Accordingly, the amount of the inevitable impurity in the clinker component must not be more than 10% by weight. It is preferable that the amount of the inevitable impurity in the clinker component be not more than 5%.

The clinker component must be one produced by sintering raw materials at a temperature of 1,200° C. or more, preferably 1,250° to 1,500° C. If the sintering temperature is less than 1,200° C., the resultant demolition-facilitating agent exhibits an unsatisfactory expansion pressure and demolition effect. A sintering temperature above 1,500° C. is not effective for increasing the demolition-facilitating property of the resultant clinker component and results in an economical disadvantage.

In the clinker component usable for the demolition-facilitating agent of the present invention, it is important that the free CaO crystals and the free 3CaO.SiO$_2$ crystals be present independently from each other. That is, the CaO crystals are not contained in the 3CaO.SiO$_2$ crystals.

In the demolition-facilitating agent of the present invention, 90 to 99% by weight of the clinker component is mixed with 1 to 10% by weight, in terms of gypsum anhydride (CaSO$_4$), of a gypsum component consisting of at least one gypsum compound.

If the amounts of the clinker component and the gypsum component are more than 99% by weight and less than 1% by weight, respectively, the resultant demolition-facilitating agent exhibits too large a hydrating reaction rate. Accordingly, when an aqueous slurry containing the demolition-facilitating agent is poured into holes formed in a durable structure, the slurry springs out of the holes due to rapid expansion of the demolition-facilitating agent.

If the amounts of the clinker component and the gypsum component are less than 90% by weight and more than 10% by weight, respectively, the resultant demolition-facilitating agent exhibits an unsatisfactory demolition effect due to the small amount of the free CaO crystals.

The gypsum compound may be selected from the group consisting of gypsum dihydrate, gypsum hemihydrate and gypsum anhydride, which may be either natural substances or synthetic products. If the gypsum component contains gypsum anhydride, it is preferable that the gypsum anhydride be a burning product of gypsum dihydrate and/or gypsum hemihydrate at a burning temperature of 1,200° C. or less. A burning temperature of more than 1,200° C. sometimes may result in the resultant gypsum anhydride having an unsatisfactory demolition effect.

Additionally, it is preferable that the amount of the impurity, such as P$_2$O$_5$, in the gypsum component be as small as possible because the impurity is effective for obstructing the hydrating reaction of the free CaO crystals.

The demolition-facilitating agent of the present invention contains 0.4 to 4 parts by weight of a cement water-reducing agent in addition to 100 parts by weight of a mixture of the clinker component and the gypsum component. The cement water-reducing agent usable for the present invention can be selected from conventional cement water-reducing agents which are available commercially. The cement water-reducing agent preferably comprises a water-reducing substance capable of significantly increasing the fluidity of the aqueous slurry of the demolition-facilitating agent even when it is used in a small amount. The water-reducing agent preferably contains a β-naphthalene sulfonic acid-formaldehyde condensation product.

An excessive amount of the cement water-reducing agent exceeding 4 parts by weight per 100 parts by weight of the mixture of the clinker component and the gypsum component is not effective for enhancing the fluidity of the aqueous slurry and results in an economical disadvantage.

If the cement water-reducing agent is used in an amount of less than 0.4 parts by weight, the aqueous slurry of the resultant demolition-facilitating agent exhibits an unsatisfactory fluidity.

The demolition-facilitating agent of the present invention can be prepared as follows.

The raw lime material usable for producing the clinker component may usually be limestone. However, slaked lime, carbide waste and/or quick lime can be used as the raw lime material. The raw silica material usable for producing the clinker component may be selected from usual silica materials, for example, silica stone and/or clay.

The raw lime material and the raw silica material are used in amounts adequate for producing the clinker component containing 15 to 97% by weight of free CaO crystals and 3 to 85% by weight of free $3CaO.SiO_2$ crystals and having a ratio in weight of CaO to $SiO_2$ of from 3.5 to 198.

The larger the contents of the impurities, for example, $Al_2O_3$ and $Fe_2O_3$, in the raw materials, the larger the contents of the impurities, for example, $3CaO.Al_2O_3$ crystals and $4CaO.Al_2O_3.Fe_2O_3$ crystals, in the resultant clinker component and the smaller the content of the free CaO crystals in the resultant clinker component. Accordingly, it is desirable that the contents of the impurities such as $Al_2O_3$ and $Fe_2O_3$ in the raw materials be as small as possible.

The raw lime materials and the raw silica materials are mixed together at a necessary mixing ratio and are pulverized by using a mixing-pulverizing apparatus, for example, a cement ball mill or a vertical mill. The mixing and pulverizing procedures may be carried out separately from each other or by using another apparatus.

The pulverizing procedure for the raw material mixture is carried out preferably to an extent that when the pulverized mixture is seived with an 88 micron screen, 20% by weight or less of the pulverized mixture remains on the screen. If the remaining amount of the pulverized mixture on the screen is more than 20% by weight, the pulverized mixture cannot be satisfactorily sintered. The pulverized mixture is optionally pelletized, and then is subjected to a sintering process at a temperature of 1,200° C. or more, preferably from 1,250° to 1,500° C.

The sintering process can be carried out in any type of atmosphere, for example, a neutral atmosphere or a slightly oxidizing atmosphere.

The resultant clinker component is admixed with a gypsum component and the resultant admixture is finely pulverized by using the same method as mentioned above. In this admixing-pulverizing process, it is preferable that the fine particles in the resultant pulverized admixture have a specific surface area of from 1,500 to 4,000 $cm^2/g$ determined by means of the Blaine permeability method. If the fine particles have a specific surface area of less than 1,500 $cm^2/g$ and are coarse, the resultant demolition-facilitating agent exhibits a low hydrating rate and an unsatisfactory expansion pressure. Also, if the specific surface area of the particles is more than 4,000 $cm^2/g$ and the particles are excessively fine, the aqueous slurry of the resultant demolition-facilitating agent exhibits a reduced fluidity. Also, the production of excessively fine particles results in a large consumption of energy and is costly.

SPECIFIC EXAMPLES

The present invention will be understood more readily with reference to the following examples. However, these examples are intended to illustrate the present invention and are not to be construed as limiting the basic conception of the present invention.

In the examples, the chemical compositions of special grades of calcium carbonate and limestone which were used as raw lime materials, special grades of silicic acid anhydride and silica stone which were used as raw silica material, and clay which was used as a raw alumina material are indicated in Table 1. Also, the chemical composition of the gypsum used is indicated in Table 2.

TABLE 1

| Raw material | Composition (% by weight) | | | | | | | | |
|---|---|---|---|---|---|---|---|---|---|
| | Ignition loss | $SiO_2$ | $Al_2O_3$ | $Fe_2O_3$ | CaO | MgO | $Na_2O$ | $K_2O$ | Total |
| Calcium carbonate | 44.0 | 0.0 | 0.0 | 0.0 | 56.0 | 0.0 | 0.00 | 0.00 | 100.00 |
| Limestone | 43.3 | 0.2 | 0.1 | 0.1 | 55.8 | 0.5 | 0.01 | 0.01 | 100.00 |
| Silicic acid anhydride | 0.1 | 99.9 | 0.0 | 0.0 | 0.0 | 0.0 | 0.00 | 0.00 | 100.00 |
| Silicia stone | 1.3 | 83.1 | 7.0 | 3.4 | 1.9 | 1.3 | 1.38 | 0.91 | 100.29 |
| Clay | 6.8 | 59.3 | 21.1 | 8.1 | 0.3 | 1.6 | 0.25 | 2.72 | 100.17 |

TABLE 2

| Composition of gypsum (% by weight) | | | | | | | | | |
|---|---|---|---|---|---|---|---|---|---|
| Ignition loss | $SiO_2$ | $Al_2O_3$ | $Fe_2O_3$ | CaO | MgO | $SO_3$ | $Na_2O$ | $K_2O$ | Total |
| 20.8 | 0.3 | 0.0 | 0.0 | 32.5 | 0.0 | 46.3 | 0.01 | 0.01 | 99.92 |

EXAMPLE 1

A mixture was prepared by using a V-type mixer from 93.8 parts by weight of calcium carbonate and 6.2 parts by weight of silicic acid anhydride, both of which had the compositions indicated in Table 1, and could completely pass through an 88 μm screen. The mixture was added to 15 parts by weight of water and pelletized into pellets having a diameter of from 5 to 15 mm by using a pan-type pelletizer and the pellets were dried. The dried pellets were placed in an electric furnace and sintered therein at a temperature of 1,400° C. for 30 minutes to prepare a clinker component.

The clinker component was comprised of 60% by weight of free CaO crystals and 40% by weight of free $3CaO.SiO_2$ crystals and was free from other crystals.

The CaO crystals and the 3CaO.SiO₂ crystals were independent from each other.

A mixture was prepared by mixing 95 parts by weight of the clinker component with 5 parts by weight of a gypsum component consisting of gypsum anhydride, which was prepared by burning gypsum dihydrate having the composition indicated in Table 2 at a temperature of 500° C. The resultant mixture was pulverized with a ball mill. The resultant particles in the pulverized mixture had a specific surface area of 3,000 cm²/g. The resultant pulverized mixture of the clinker component and the gypsum component was mixed with 0.6 parts by weight of a cement water-reducing agent which comprised a β-naphthalene sulfonic acid-formaldehyde condensation product and was available under the trademark of Mighty 100 (manufactured by Kao Soap Co.). The mixture was pulverized to provide a demolition-facilitating agent.

An aqueous slurry was prepared by mix-kneading 100 parts by weight of the demolition-facilitating agent with 34 parts by weight of water. The slurry was flowed into a steel vessel provided with an open end and a closed end and having an inner diameter of 40 mm and a length of 600 mm so as to completely fill the steel vessel. The filling procedure could be smoothly carried out without difficulty and without rapidly decreasing the softness of the slurry.

The expansion pressure created by the slurry in the steel vessel was measured by using two strain gauges fixed in the center portion of the steel vessel in an air-conditioned, constant-temperature chamber at a temperature of 20° C.

The results of the measurement of the expansion pressure are indicated in Table 3.

EXAMPLES 2 THROUGH 4

In each of the Examples 2 through 4, the same procedures as those described in Example 1 were carried out except that the clinker sintering temperature was changed to 1,200° C. in Example 2, to 1,300° C. in Example 3, and to 1,500° C. in Example 4.

The results of the expansion pressure measurement are indicated in Table 3.

COMPARATIVE EXAMPLE 1

The same procedures for producing the clinker component as those described in Example 1 were carried out except that the clinker-sintering temperature was changed to 1,100° C. However, during the sintering process, the sintered materials were powderized and, therefore, no clinker component was obtained. The powderized materials were used in place of the clinker component of Example 1 to produce a comparative demolition-facilitating agent.

The expansion pressure of the comparative demolition-facilitating agent was measured. The results are indicated in Table 3.

TABLE 3

| | | Expansion pressure (kg/cm²) | | |
|---|---|---|---|---|
| | | After 6 hours (*)₁ | After 12 hours (*)₁ | After 24 hours (*)₁ |
| Example | 1 | 160 | 310 | 450 |
| | 2 | 130 | 190 | 320 |
| | 3 | 180 | 320 | 420 |
| | 4 | 170 | 310 | 430 |
| Comparative Example | 1 | Measurement of the expansion pressure failed because the slurry sprang out of the vessel. | | |

(*)₁ The expansion pressure was measured 6, 12, or 24 hours after filling the slurry into the vessel.

EXAMPLES 5 THROUGH 8 AND COMPARATIVE EXAMPLES 2 AND 3

In each of the Examples 5 through 8 and Comparative Examples 2 and 3, the same procedures as those described in Example 1 were carried out except that the composition of the clinker component was changed to that indicated in Table 4.

The results of measurement of the expansion pressure are indicated in Table 4.

TABLE 4

| Example No. | | Composition of clinker component (% by weight) | | Expansion pressure (kg/cm²) | | |
|---|---|---|---|---|---|---|
| | | CaO | 3CaO SiO₂ | After 6 hours | After 12 hours | After 24 hours |
| Example | 5 | 97 | 3 | 330 | 430 | 480 |
| | 6 | 80 | 20 | 250 | 370 | 460 |
| | 7 | 40 | 60 | 120 | 280 | 400 |
| | 8 | 20 | 80 | 80 | 150 | 300 |
| Comparative Example | 2 | 98 | 2 | (*)₂ | (*)₂ | (*)₂ |
| | 3 | 10 | 90 | 40 | 80 | 110 |

(*)₂ Measurement of the expansion pressure failed because the slurry sprang out of the vessel.

EXAMPLES 9 THROUGH 12 AND COMPARATIVE EXAMPLE 4

In each of the Examples 9 through 12 and Comparative Example 4, the same procedures as those described in Example 1 were carried out except that the gypsum anhydride was replaced by the type of gypsum compound indicated in Table 5.

The results of measurement of the expansion pressure are indicated in Table 5.

TABLE 5

| Example No. | | Type of gypsum compound | Expansion pressure (kg/cm²) | | |
|---|---|---|---|---|---|
| | | | After 6 hours | After 12 hours | After 24 hours |
| Example | 9 | Gypsum dihydrate | 160 | 300 | 430 |
| | 10 | Gypsum hemihydrate | 150 | 290 | 420 |
| | 11 | Gypsum anhydride (*)₃ | 190 | 330 | 450 |
| | 12 | Gypsum anhydride (*)₄ | 220 | 270 | 450 |
| Comparative Example | 4 | Gypsum anhydride (*)₅ | Measurement of the expansion pressure failed because slurry sprang out of the vessel. | | |

(*)₃ Prepared by burning gypsum dihydrate at 800° C.
(*)₄ Prepared by burning gypsum dihydrate at 1100° C.
(*)₅ Prepared by burning gypsum dihydrate at 1300° C.

EXAMPLES 13 AND 14 AND COMPARATIVE EXAMPLE 5

In each of the Examples 13 and 14 and Comparative Example 5, the same procedures as those described in Example 1 were carried out except that the gypsum component was used in the amount indicated in Table 6.

The results of measurement of the expansion pressure are indicated in Table 6.

TABLE 6

| Example No. | | Amount of gypsum component (% by weight) | Expansion pressure (kg/cm$^2$) | | |
|---|---|---|---|---|---|
| | | | After 6 hours | After 12 hours | After 24 hours |
| Example | 13 | 1 | 230 | 330 | 440 |
| | 14 | 10 | 130 | 270 | 390 |
| Comparative Example | 5 | 0 | Measurement of the expansion pressure failed because the slurry sprang out of the vessel. | | |

EXAMPLES 15 THROUGH 17

In Examples 15 through 17, the same procedures as described in Examples 1, 5 and 6, respectively, were carried out except that measurement of the expansion pressure was carried out in a constant-temperature chamber air-conditioned to a temperature of 5° C. The results are indicated in Table 7.

TABLE 7

| Example No. | Expansion pressure (kg/cm$^2$) | | |
|---|---|---|---|
| | After 6 hours | After 12 hours | After 24 hours |
| 15 | 50 | 110 | 250 |
| 16 | 130 | 270 | 420 |
| 17 | 90 | 190 | 390 |

Table 7 shows that the larger the content of the free CaO crystals in the demolition-facilitating agent, the smaller the influence of the demolition temperature on the expansion pressure. That is, the demolition-facilitating agent containing a large amount of the free CaO crystals can exhibit a large expansion pressure even at a low temperature.

EXAMPLES 18 THROUGH 21 AND COMPARATIVE EXAMPLE 6

In each of Examples 18 through 21 and Comparative Example 6, a mixture was prepared from 92.5 parts by weight of limestone, 3.5 parts by weight of silica stone and 4.0 parts by weight of clay, which raw materials had the compositions indicated in Table 1. The mixture was pulverized with a ball mill to an extent that when the pulverized mixture was sieved through an 88 μm net screen, 5% by weight of the pulverized mixture remained on the screen.

The pulverized mixture was mixed with 15 parts by weight of water and pelletized by using a pan-type pelletizer and then the resultant pellets having a diameter of 5 to 20 mm, was dried. The dried pellets were placed in a rotary kiln having an inner diameter of 0.5 m and a length of 12 m and sintered therein at the sintering temperature indicated in Table 8 so as to prepare a clinker component. The resultant clinker component was comprised of 58% by weight of free CaO crystals, 35% by weight of free 3CaO.SiO$_2$ crystals which were independent from the CaO crystals, and 6% by weight of 3CaO.Al$_2$O$_3$ and 4CaO.Al$_2$O$_3$.Fe$_2$O$_3$.

The resultant clinker component was subjected to the same procedures for preparing a demolition-facilitating agent and for measuring the expansion pressure as those described in Example 1. The results are indicated in Table 8.

TABLE 8

| Example No. | | Sintering temperature (°C.) | Expansion pressure (kg/cm$^2$) | | |
|---|---|---|---|---|---|
| | | | After 6 hours | After 12 hours | After 24 hours |
| Example | 18 | 1400 | 170 | 320 | 440 |
| | 19 | 1200 | 120 | 190 | 330 |
| | 20 | 1300 | 190 | 330 | 430 |
| | 21 | 1500 | 150 | 310 | 440 |
| Comparative Example | 6 | 1100 | Measurement of the expansion pressure failed because the slurry sprang out of the vessel. | | |

In Comparative Example 6, the sintered raw materials were powderized in the sintering process and, therefore, no clinker was obtained. The same procedures for producing the demolition-facilitating agent as those described in Example 1 were carried out except that the powderized, sintered materials were used in place of the clinker component.

EXAMPLES 22 THROUGH 25 AND COMPARATIVE EXAMPLES 7 AND 8

In each of the Examples 22 through 25 and Comparative Examples 7 and 8, the same procedures as those described in Example 18 were carried out except that the amounts of the free CaO crystals and the free 3CaO SiO$_2$ crystals in the clinker component were changed to those indicated in Table 9. The results of measurement of the expansion pressure are indicated in Table 9.

TABLE 9

| Example No. | | Amounts of crystals in clinker component (% by weight) | | Expansion pressure (kg/cm$^2$) | | |
|---|---|---|---|---|---|---|
| | | CaO | 3CaO.SiO$_2$ | After 6 hours | After 12 hours | After 24 hours |
| Example | 22 | 96 | 3 | 320 | 430 | 480 |
| | 23 | 78 | 16 | 240 | 360 | 450 |
| | 24 | 40 | 53 | 120 | 280 | 400 |
| | 25 | 20 | 72 | 80 | 150 | 300 |
| Comparative Example | 7 | 98 | 1 | (*)$_6$ | (*)$_6$ | (*)$_6$ |
| | 8 | 10 | 82 | 40 | 80 | 110 |

(*)$_6$ The expansion pressure could not be measured because the slurry sprang out of the vessel due to rapid hydration-expansion of the slurry.

EXAMPLES 26 THROUGH 29 AND COMPARATIVE EXAMPLE 9

In each of the Examples 26 through 29 and Comparative Example 9, the same procedures as those described in Example 18 were carried out except that the gypsum anhydride was replaced by the type of gypsum compound indicated in Table 10. The results of measurement of the expansion pressure are indicated in Table 10.

TABLE 10

| Example No. | | Type of gypsum compound | Expansion pressure (kg/cm$^2$) | | |
|---|---|---|---|---|---|
| | | | After 6 hours | After 12 hours | After 24 hours |
| Example | 26 | Gypsum dihydrate | 170 | 310 | 440 |
| | 27 | Gypsum hemihydrate | 160 | 300 | 430 |
| | 28 | Gypsum anhydride (*)$_3$ | 200 | 340 | 460 |
| | 29 | Gypsum anhydride (*)$_4$ | 230 | 290 | 460 |
| Comparative Example | 9 | Gypsum anhydride (*)$_5$ | Measurement of expansion pressure failed because | | |

TABLE 10-continued

| Example No. | Type of gypsum compound | Expansion pressure (kg/cm²) | | |
|---|---|---|---|---|
| | | After 6 hours | After 12 hours | After 24 hours |
| | | slurry sprang out of vessel. | | |

(*)₃ Prepared by burning gypsum dihydride at 800° C.
(*)₄ Prepared by burning gypsum dihydride at 1100° C.
(*)₅ Prepared by burning gypsum dihydride at 1300° C.

EXAMPLES 30 AND 31 AND COMPARATIVE EXAMPLE 10

In each of the Examples 30 and 31 and Comparative Example 10, the same procedures as those described in Example 18 were carried out except that gypsum anhydride was used in the amount indicated in Table 11. The results of measurement of the expansion pressure are indicated in Table 11.

TABLE 11

| Example No. | | Amount of gypsum anhydride (% by weight) | Expansion pressure (kg/cm²) | | |
|---|---|---|---|---|---|
| | | | After 6 hours | After 12 hours | After 24 hours |
| Example | 30 | 1 | 240 | 340 | 450 |
| | 31 | 10 | 140 | 280 | 400 |
| Comparative Example | 10 | 0 | Measurement of expansion pressure failed because slurry sprang out of vessel | | |

EXAMPLES 32 THROUGH 34

In Examples 32, 33 and 34, the same procedures as those described in Examples 18, 22 and 23, respectively, were carried out except that measurement of the expansion pressure was carried out in a constant-temperature chamber air-conditioned at a temperature of 5° C. The results of measurement of the expansion pressure are indicated in Table 12.

TABLE 12

| Example No. | Expansion pressure (kg/cm²) | | |
|---|---|---|---|
| | After 6 hours | After 12 hours | After 24 hours |
| 32 | 60 | 120 | 260 |
| 33 | 140 | 280 | 430 |
| 34 | 100 | 200 | 400 |

EXAMPLE 35

In a limestone quarry 30 vertical holes each having a diameter of 50 mm and a depth of 4,000 mm were formed in a limestone bed at intervals of 800 mm (at a line of least resistance of 600 mm). The same slurry as that used in Example 18 was poured into the vertical holes so as to demolish the limestone bed. Eight hours after the pouring operation was completed, many cracks were formed in the limestone bed, and 24 hours after the pouring operation, the limestone bed was demolished to an extent that it was able to be easily divided into small lumps merely by lightly striking it with a hammer.

EXAMPLE 36

In order to demolish an iron rod-reinforced concrete pile having an 800 mm square cross section and a 2,500 mm length, 9 holes each having a diameter of 40 mm and a depth of 1,500 mm were drilled in the top portion of the pile at intervals of 300 mm. The holes were filled with the same demolition-facilitating material slurry as that used in Example 18.

It was observed that 8 hours after the filling operation was completed, a number of cracks were produced in the pile and 24 hours after the filling operation, the pile could be demolished merely by lightly hammering the peripheral surface of the pile. The main iron reinforcing rods were removed by melt-cutting them with a gas burner. It was found that the core portion of the pile which was surrounded by the iron reinforcing rods was completely demolished to an extent that the core portion could be removed with a shovel.

From the above-described examples, it is clear that the demolition-facilitating agent of the present invention exhibits an excellent expansion pressure and a superior demolition effect than that of conventional demolition-facilitating material.

What is claimed is:

1. A demolition-facilitating agent for durable structures, comprising:
 (A) 100 parts by weight of a mixture in the form of fine particles, consisting essentially of
  (1) 95 to 99% by weight of a clinker consisting of (a) 78 to 97% by weight of free CaO crystals, (b) 3 to 22% by weight of free $3CaO \cdot SiO_2$ crystals and (c) 0 to 10% by weight of an impurity, said clinker having been produced at a sintering temperature of at least 1200° C.;
  (2) 1 to 5% by weight, of at least one gypsum anhydride ($CaSO_4$); and
 (B) 0.4 to 4 parts by weight of a cement water-reducing agent.

2. The demolition-facilitating agent as claimed in claim 1, wherein said cement water-reducing agent comprises a $\beta$-naphthalene sulfonic acid-formaldehyde condensation product.

3. The demolition-facilitating agent as claimed in claim 1, wherein said sintering temperature in the production of said clinker is in the range of from 1250° to 1500° C.

4. The demolition-facilitating agent as claimed in claim 1, wherein said gypsum compound is selected from the group consisting of gypsum dihydrate gypsum hemihydrate and gypsum anhydride.

5. The demolition-facilitating agent as claimed in claim 4, wherein said gypsum anhydride is one produced by burning a gypsum hydride at a temperature of 1200° C. or less.

6. The demolition-facilitating agent as claimed in claim 1, wherein said mixture of said clinker and said gypsum compound is in the form of fine particles having a specific surface area of from 1,500 to 4,000 cm²/g determined by means of the Blaine permeability method.

7. A demolition-facilitating aqueous slurry for durable structures, comprising:
 (A) 100 parts by weight of a mixture in the form of fine particles, consisting essentially of
  (1) 95 to 99% by weight of a clinker consisting of (a) 78 to 97% by weight of free CaO crystals, (b) 3 to 22% by weight of free $3CaO \cdot SiO_2$ crystals and (c) 0 to 10% by weight of an impurity, said clinker having been produced at a sintering temperature of at least 1200° C.;
  (2) 1 to 5% by weight, of at least one gypsum anhydride ($CaSO_4$);
 (B) 0.4 to 4 parts by weight of a cement water-reducing agent; and (C) sufficient water to form a pourable slurry.

8. A method for demolishing a durable structure comprising:

providing a plurality of holes in a durable structure;

filling the holes with an aqueous slurry of a demolition facilitating agent comprising (A) 100 parts by weight of a mixture in the form of fine particles, consisting essentially of
  (1) 95 to 99% by weight of a clinker consisting of
    (a) 78 to 97% by weight of free CaO crystals, (b) 3 to 22% by weight of free $3CaO \cdot SiO_2$ crystals and (c) 0 to 10% by weight of an impurity, said clinker having been produced at a sintering temperature of at least 1200° C.;
  (2) 1 to 5% by weight, of at least one gypsum anhydride ($CaSO_4$); and (B) 0.4 to 4 parts by weight of a cement water-reducing agent, leaving the aqueous slurry in the holes for a period sufficient to allow the demolition-faciltating agent to generate an expansion pressure and to demolish the durable structure.

* * * * *